Aug. 2, 1927.　　　　P. KILLINGER　　　　1,637,999
WHEEL ATTACHMENT FOR SLEDS
Filed March 8, 1926
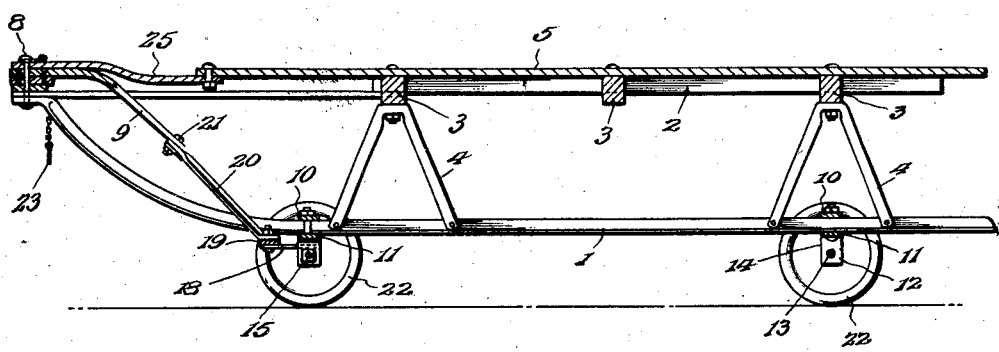
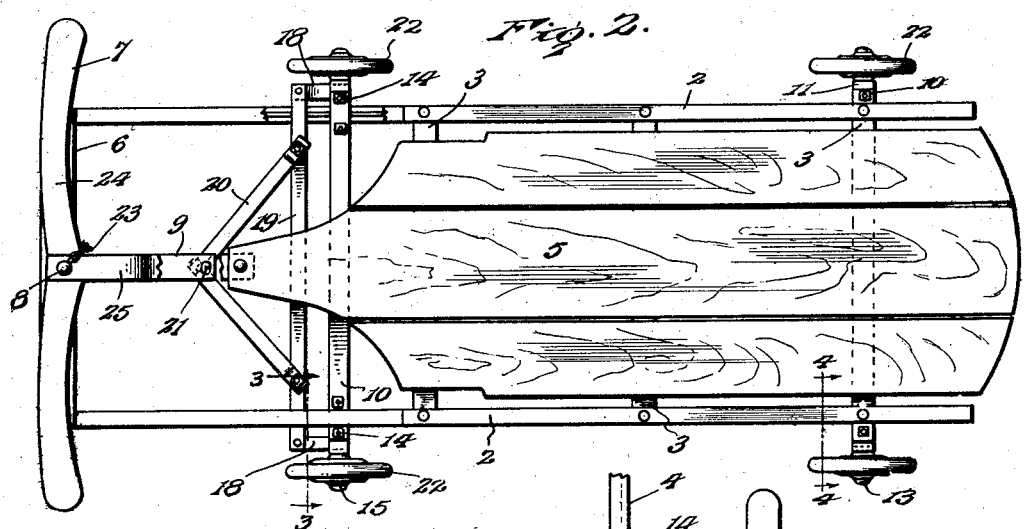
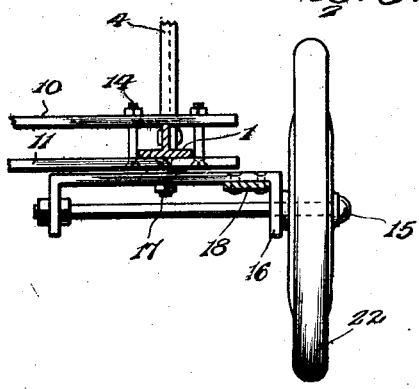
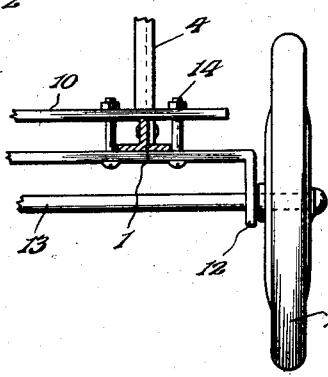
Inventor
Paul Killinger.
By Lacey & Lacey, Attorneys.

Patented Aug. 2, 1927.

1,637,999

UNITED STATES PATENT OFFICE.

PAUL KILLINGER, OF SHIPPENSBURG, PENNSYLVANIA.

WHEEL ATTACHMENT FOR SLEDS.

Application filed March 8, 1926. Serial No. 93,296.

A sled has a limited use, being restricted to periods when ice and snow cover the surface. A vehicle of this nature is particularly desirable since it can be readily and easily handled for coasting.

The present invention has for its primary object to enable a sled to be used during any season of the year with substantially the same advantages incident to a vehicle of the sled type as ordinarily constructed.

The invention provides a wheel attachment which may be easily and quickly applied to a sled to convert the same into a wheeled vehicle for use upon a pavement or other surface, and which may be readily removed to adapt the sled for running upon an ice or snow covered surface.

While the drawings illustrate a preferred embodiment of the invention it is to be understood that in adapting the means to meet specific needs and requirements, the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a vertical central, longitudinal sectional view of a sled of well-known construction, mounted upon wheels embodying the invention, Figure 2 is a top plan view of the sled and wheel attachment, Figure 3 is a detail sectional view on the line 3—3 of Figure 2, showing the parts on a larger scale, and Figure 4 is an enlarged detail sectional view on the line 4—4 of Figure 2.

Corresponding and like parts are referred to in the following description and designated in the several views of the drawings, by like reference characters.

The sled illustrated is of ordinary construction and of the type adapted to be steered by the rider from the seat board and comprises runners 1, side bars 2, cross bars 3 connecting the side bars 2, knees 4 between the runners 1 and the front and rear cross bars 3 and a seat board 5. The front ends of the runners 1 curve upwardly and forwardly and are connected at their upper front ends by a cross bar 6. A handle bar 7 is connected intermediate its ends to the cross bar 6 by means of a bolt 8. A short longitudinal bar 9 connects the handle bar 7 with the front end of the seat board 5. In accordance with the present invention, the longitudinal bar 9 is detachably connected at its rear end with the seat board 5 so as to be bent downwardly at its rear end, as shown most clearly in Figure 1, to be connected to the wheel attachment.

The wheel attachment comprises front and rear axles, the latter being fixed and the former pivoted. Clamps are provided for detachably connecting the axles to the runners 1 and these clamps are of similar construction, as illustrated most clearly in Figures 3 and 4. Each of the clamps consists of an upper bar 10 and a lower bar 11. The lower bar 11 of the rear clamp has its opposite ends bent downwardly, as indicated at 12 and apertured to receive the rear axle 13. A pair of bolts 14 connects opposite end portions of each of the clamp bars 10 and 11 and the bolts of each pair are spaced apart a distance corresponding to the width of the runners 1, as shown most clearly in Figures 3 and 4.

The front axles 15 are supported in mounts 16 which are pivotally connected intermediate their ends to the lower clamp bars 11, as designated at 17 in Figure 3. An arm 18 projects forwardly from the outer end of each of the mounts 16 and a link 19 extending transversely of the sled parallel with the front clamps and axles, connects the front ends of the arms 18. Links 20 connected at their rear ends to the transverse link 19 incline inwardly and forwardly and are connected to the rear end of the longitudinal bar 9, as indicated at 21. This arrangement admits of the mounts 16 of the front axle being turned for steering the vehicle when mounted upon the wheels. The outer ends of the axles are provided with wheels 22 which may be of any design and diameter. The front axle mounts 16 may be of any construction and pivoted to the front clamp in any determinate and substantial way.

A pin 23 is provided and is adapted to be thrust into registering openings 24 formed in the handle bar 7 and cross bar 6 to prevent movement of the handle bar and to hold the front wheels straight when coasting.

A brace 25 is provided and is interposed between the parts 6 and 7 and the front end of the seat board 5 to strengthen the handle bar support when the bar 9 is disconnected from the seat board and bent downwardly to make connection with the forwardly converged ends of the links 20. Ordinarily, the brace 25 is not required since the bar 9 is connected at its rear end to the seat board 5 but when the wheels are in position, the bar 9 is detached from the part 5 and connected to the links 20 and in this arrangement, the advantage of the brace 25 is manifest. The construction is such as to admit of the front axles being reversably clamped on the runners if desired.

Having thus described the invention, I claim:

In combination with a sled having a body, runners, a cross bar connecting the forward ends of said runners, a handle bar above said cross bar, and a pivot pin connecting the handle bar with the cross bar, a turning bar rigidly secured to said handle bar and extending rearwardly therefrom at its point of pivotal mounting and projected downwardly, a brace pivoted to the forward end of said body and projecting forwardly over the forward end of said turning bar, said pin being extended through the forward end of said brace, wheel mountings pivotally mounted at opposite sides of the sled, arms extending forwardly from said mountings, a bar connecting said arms, and links connected to said connecting bar and extending forwardly and upwardly therefrom in converging relation to each other and connected to the rear end portion of said turning bar.

In testimony whereof I affix my signature.

PAUL KILLINGER. [L. S.]